July 21, 1942.　　　A. H. NEULAND　　　2,290,764

FLUID MOTOR OR PUMP

Filed March 4, 1941

INVENTOR.
Alfons. H. Neuland

Patented July 21, 1942

2,290,764

UNITED STATES PATENT OFFICE 2,290,764

FLUID MOTOR OR PUMP

Alfons H. Neuland, Irvington, N. J.

Application March 4, 1941, Serial No. 381,612

8 Claims. (Cl. 103—162)

This invention relates to multi-cylinder displacement devices and particularly to fluid motors and pumps of the type having rotating cylinders and pistons.

The object of the invention is to improve the power and efficiency of a motor or pump of this type and to provide a device suitable for operation at high speed.

My invention resides in a novel construction, and in the combination and arrangement of certain of its component parts. The foregoing and other objects and advantages of my invention will appear in the following description and from the drawing showing a preferred embodiment of my invention, and will hereafter be more fully defined in the appended claims.

Figure 1:
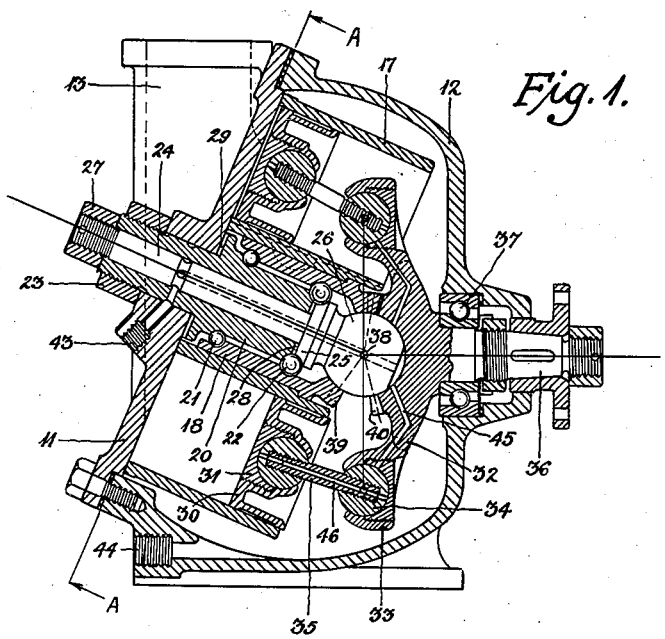
Fig. 1 is a vertical section through a device embodying my invention.

Referring to the figures, the numeral 11 designates a stationary valve element which, together with the stationary housing element 12 may form a housing enclosing the inner elements of the device. The valve element is provided with inlet and outlet ducts 13 and 14 respectively, arranged at an angle with respect to, and converging with the laterally arranged valve face to form inlet and outlet ports 15 and 16. The cylinder element 17 is provided with a plurality of cylinder bores arranged laterally in a circle and is preferably further provided with a central bore within which a bearing element or liner 18 is firmly secured. The liner 18 may be secured within the cylinder element by press fitting and the key 19 as shown, or in any other suitable manner. The cylinder element 17 is rotatably mounted upon a pintle 20, by anti-friction bearings which, in the present embodiment, comprise the radial and thrust ball bearings 21, 22 operating in raceways provided for the purpose in the pintle and liner 18. The pintle 20 may be formed as an integral part of the valve element but is preferably formed separately and rigidly secured thereto. When formed separately as shown, one end of the pintle is provided with a shank which extends through a central bore in the valve element and is firmly secured thereto by the nut 23, while the other end of the pintle is provided with a separate journal element 24, shaped to form a thrust ball race 25 and preferably also to include a spherical journal portion 26 as an integral part thereof. The journal element 24 is preferably provided with a shank extending axially through the pintle and is firmly locked thereto by the nut 27. With this arrangement and with the aid of a washer 28 of proper thickness, free rotation and a substantially unvarying working clearance between cylinder element and valve may readily be secured, and with the aid of another washer 29 of proper thickness, the pintle is rigidly secured to the valve plate so as to provide a minimum clearance between cylinder element and valve plate, just sufficient to prevent rubbing.

Each cylinder is preferably entirely open at both ends and is provided with a piston 30 shaped to form a central spherical bearing, within which a ball journal 31 is arranged. I further provide a power element 32 having arms 33 preferably adapted to extend into the cylinders, each provided with a spherical bearing and a ball journal 34 connected with ball journal 31 by means of a rod 35. Power is delivered to or from the device by the power shaft 36, which may be formed separately from but is preferably formed integral with the power element 32 and is arranged to rotate therewith on an axis angularly displaced with respect to the rotational axis of the cylinder element. The power element 32 is provided, on one side with a spherical bearing surface engaging with the spherical journal portion 26, and on the other side is supported within the housing by an anti-friction thrust bearing such as the ball bearing 37. With this arrangement the axis of rotation of cylinder element and power shaft are made to meet or intersect at the point 38 in the center of the spherical journal 26. I further provide gearing for preventing relative circumferential movement between the cylinder element and the piston element and to maintain synchronous relationship therebetween. In the embodiment shown in the drawing, this is accomplished by the provision of gear teeth 39, cut in the face of bearing element 18, meshing with gear teeth 40 cut in the face of the piston plate or power shaft 36. The teeth are cut so that each set forms a bevel, or spiral bevel gear having pitch lines that meet at the point 38. It will of course be understood that the bevel gears may be formed separately and firmly secured to their respective elements.

Figure 3:
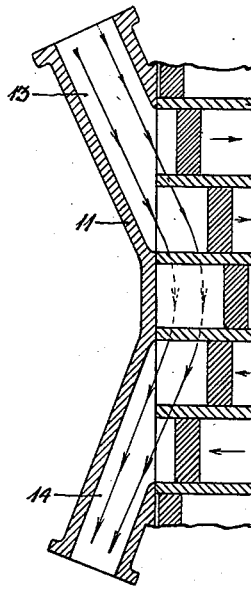
Fig. 3 is a diagrammatic, developed view of valve element and cylinders, showing the flow of fluid through the device.
Figure 2:
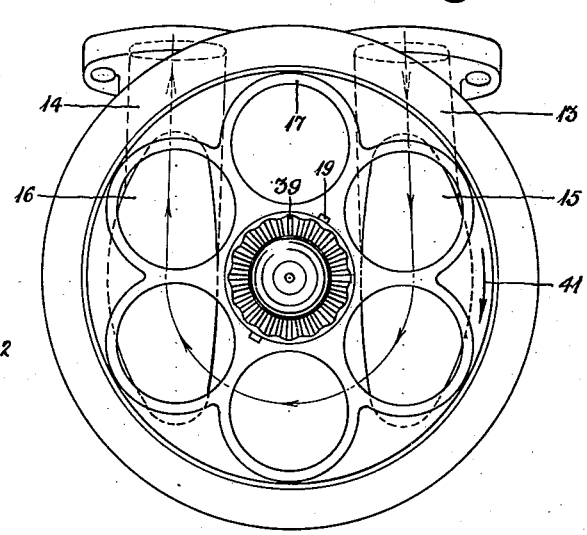
Fig. 2 is a transverse view of the cylinder element and valve element assembly viewed in the direction A—A, in Figure 1.

When the device is operated as a pump, power from a suitable source, not shown, applied to the shaft 36, drives the piston element and, through the gearing, the cylinder element in synchronism therewith, causing the pistons to reciprocate within the cylinders. The ports 15, 16 in the valve plate are arranged so that one port faces the advancing pistons and the other faces the receding pistons. Assuming clockwise rotation as shown by the arrow 41 in Fig. 2, fluid is drawn downward into the cylinder at the right through the inlet duct 13 and as each filled cylinder passes the bottom position, the direction of motion of the fluid therein is reversed and as it registers with the outlet port at the left, it is expelled upward into outlet duct 14. I prefer to proportion the ducts so that the velocity of the fluid flow therein is substantially the same as the average velocity of the rotating cylinder element. This feature is clearly illustrated by the diagrammatic developed view in Fig. 3, in which the movement of the cylinder element 17, with respect to the valve element 11, is indicated by the arrow 42. Fluid entering through inlet duct 13, converges with the downwardly moving open ended cylinders and because both move with substantially the same velocity, the formation of eddy currents and the losses accompanying such currents are thereby reduced. When the device is used in connection with a non-compressible fluid the outlet duct may be proportioned and arranged to converge with the valve face identically as the inlet duct. However if the device is used in connection with a compressible fluid such as air, I prefer to proportion the outlet duct so that its section is less than that of the inlet duct, and to arrange it so that it converges with the valve face at a steeper angle. In this manner, even though the volume of the compressed outgoing fluid is reduced, its velocity may be made to equal that of the incoming non-compressed fluid. It should be borne in mind that the inlet and outlet ducts converge with the valve face from substantially the same direction as shown in Fig. 2. My arrangement and construction enables the fluid to flow through the device unobstructedly and at a substantially uniform velocity and without abrupt changes in direction which, together with my other features of construction and arrangement permits the operation of the device at relatively high speed and makes it possible to secure improved efficiency.

Lubrication of the device is provided from an oil pump or other source, not shown, introduced through duct 43 and returned through the opening 44 in the casing. Oil reaches the flattened end of the spherical journal 26 through oil holes in the pintle, as shown, and through the oil ducts 45 in each arm reaches the ball journal 34 and through the ducts 46 in rod 35 reaches the ball journal 31; the surplus out of the bearings reaching the cyinder walls.

Because of the high speed at which it may be operated, my device is well suited for use with internal combustion engines as an air or gas compressor. In this connection my construction and arrangement for securing a smooth flow of fluid through the device and a small clearance between cylinder element and valve plate, are of particular importance as the former insures a high volumetric efficiency at high speed and the latter reduces air leakage to a minimum.

It should be noted that the device may also be used in connection with non-compressible fluids, such as oil and that it may be used as a motor driven by compressible or non-compressible fluids.

It should be noted that various changes may be made in the details of construction and combination of the various parts of my device and one or more of the features disclosed herein may be used in the illustrated or other embodiments without departing from the spirit of my invention, and I desire to cover by my claims such changes and other embodiments which may reasonably be included within the scope of my invention.

I claim as my invention:

1. A rotary fluid pump or motor comprising in combination a stationary pintle and an annular rotatable cylinder element having laterally extending substantially open ended cylinders and provided with bearing means mounting said cylinder element on said pintle in operatively rigid and laterally unyielding relation forming a pintle assembly; a stationary housing comprising a housing element and a valve element having a circular valve face arranged opposite the open end of said cylinders and provided with means for firmly joining the central portion of the valve element with said pintle forming a fixed lateral working clearance between valve face and cylinder element and further provided with angularly extending inlet and outlet fluid ducts arranged to converge with the valve face at a steep angle from the perpendicular with respect thereto to form therein angularly extending inlet and outlet ports and to form inlet and outlet passages at angularly adjacent ends of said ports directing the entering and exiting fluid unidirectionally along substantially the entire angular extent of their respective ports, the converging portion of the inlet duct being shaped so that its section with respect to the valve face gradually diminishes in the direction of rotation of the cylinder element over substantially the entire angular extent of the inlet port and the converging portion of the outlet duct being shaped so that its section with respect to the valve face gradually increases in the direction of rotation of the cylinder element over substantially the entire angular extent of the outlet port thereby effecting a smooth flow of fluid through the device; pistons in said cylinders and means for effecting reciprocation of the pistons in said cylinders, said last mentioned means including a pair of meshing bevel gears having like pitch cones, one of said gears being fixedly associated with said cylinder element and concentric with its rotational axis, and further including a rotatable piston reciprocating element operatively associated with said pistons and fixedly associated with the other of said gears in concentric relation therewith providing a synchronous driving connection with said cylinder element and having a power connection and bearing means on its outer side for rotationally supporting it by said housing element on an axis angularly displaced with respect to and converging at the vertex with the rotational axis of said cylinder element and having means on its inner side for operatively supporting it by said pintle assembly and for substantially aligning the pitch cone centers of said gears with each other and with said vertex, said last mentioned means including a spherically surfaced body associated with said pintle assembly and with the inner side of said piston reciprocating element.

2. In a fluid pump or motor of the class wherein a valve element is provided with a circular laterally facing valve face, the valve face is operatively associated with laterally extending cylinders of a relatively rotatable cylinder element and pistons in said cylinders are connected to and reciprocated by rotation of a piston actuating element rotating with but on an axis angularly displaced with respect to the rotational axis of said cylinder element, the combination with said valve element of angularly extending inlet and outlet fluid ducts arranged to converge with said valve face at a steep angle from the perpendicular with respect thereto to form therein angularly extending inlet and outlet ports and to form inlet and outlet passages at angularly adjacent ends of said ports directing the entering and exiting fluid unidirectionally along substantially the entire angular extent of their respective ports, the converging portion of the inlet duct being shaped so that its section with respect to the valve face gradually diminishes in the direction of rotation of the cylinder element over substantially the entire angular extent of the inlet port and the converging portion of the outlet duct being shaped so that its section with respect to the valve face gradually increases in the direction of rotation of the cylinder element over substantially the entire angular extent of the outlet port thereby effecting a smooth and efficient flow of fluid through the devices.

3. In a fluid pump or motor of the class wherein a valve element is provided with a circular valve surface, the valve surface is operatively associated with the cylinders of a relatively rotatable cylinder element and pistons in said cylinders are reciprocated by rotation of a piston actuating element rotating with but on an axis displaced with respect to the rotational axis of said cylinder element, the combination with said valve element of angularly extending inlet and outlet fluid ducts arranged to converge with said valve surface at a steep angle from the perpendicular with respect thereto to form therein angularly extending inlet and outlet ports and to form inlet and outlet passages at angularly adjacent ends of said ports directing the entering and exiting fluid unidirectionally along substantially the entire angular extent of their respective ports, the converging portion of the inlet duct being shaped so that its section with respect to the valve surface gradually diminishes in the direction of rotation of the cylinder element over substantially the entire angular extent of the inlet port and the converging portion of the outlet duct being shaped so that its section with respect to the valve surface gradually increases in the direction of rotation of the cylinder element over substantially the entire angular extent of the outlet port thereby effecting a smooth and efficient flow of fluid through the device.

4. In a fluid pump or motor of the class wherein a valve element is provided with a circular valve surface, the valve surface is operatively associated with cylinders of a relatively rotatable cylinder element and pistons in said cylinders are reciprocated by a piston actuating element rotating with but on an axis angularly displaced with respect to the rotational axis of said cylinder element, the combination with said valve element of an angularly extending fluid duct arranged to converge with the valve surface at a steep angle from the perpendicular with respect thereto to form therein an angularly extending port and to form a passage at one end of said port directing fluid unidirectionally along substantially the entire angular extent of said port, the converging portion of said duct being shaped so that its section with respect to the valve surface gradually diminishes over substantially the entire angular extent of said port and said cylinder element being operated unidirectionally with the flow of fluid through said passage whereby eddy currents and fluid friction are substantially reduced.

5. In a fluid pump or motor of the class wherein a valve element is provided with a circular valve surface, the valve surface is operatively associated with cylinders of a relatively rotatable cylinder element and pistons in said cylinders are reciprocated by rotation of a piston actuating element rotating with but on an axis angularly displaced with respect to the rotational axis of said cylinder element, the combination with said valve element of an angularly extending fluid duct arranged to converge with the valve surface at a steep angle from the perpendicular with respect thereto to form therein an angularly extending port and to form a passage at one end of said port directing fluid unidirectionally along substantially the entire angular extent of said port, said cylinder element being operated unidirectionally with the flow of fluid along said port and the converging portion of said duct being shaped so that its section with respect to the valve surface gradually diminishes over substantially the entire angular extent of said port at a rate whereby the average velocity of the fluid flowing angularly along the port is substantially the same as that of the cylinders rotating past said port thereby reducing eddy currents and energy loss at said port and facilitating operation at high speed.

6. In a rotary fluid pump or motor of the class wherein a stationary valve element and a housing element form a housing, the valve element is provided with a circular laterally facing valve face and with inlet and outlet fluid ducts terminating in ports arranged in the valve face, the valve face is operatively associated with laterally extending cylinders of an annular rotatable cylinder element, and pistons in said cylinders are operatively associated with and reciprocated by rotation of a piston reciprocating element provided with a power connection and rotationally supported on its outer side by said housing element on an axis angularly displaced with respect to and converging at the vertex with the rotational axis of said cylinder element, the combination with said cylinder and valve elements of a stationary pintle extending from the central portion of the valve element into said cylinder element provided with bearing means mounting the cylinder element on said pintle in operatively rigid and laterally unyielding relation, the cylinder element and pintle forming a pintle assembly providing a fixed lateral working clearance between valve face and cylinder element; and means for operatively supporting the inner side of said piston reciprocating element by said pintle assembly in circumferentially unyielding relation with respect to said cylinder element, said last mentioned means including a pair of meshing bevel gears having like pitch cones, one of said gears being fixedly associated with said cylinder element and concentric with its rotational axis and the other gear being fixedly associated with said piston reciprocating element and concentric with its rotational axis, and further including a spherically surfaced body associated with said pintle assembly and with the inner side of said piston reciprocating element serving to substantially align the pitch cones centers of said gears with each other and with said vertex.

7. In a rotary fluid pump or motor of the class wherein a stationary valve element and a housing element form a housing and the valve element is provided with a circular laterally facing valve face and with inlet and outlet fluid ducts terminating in ports arranged in the valve face, the valve face is operatively associated with laterally extending cylinders of an annular rotatable cylinder element and pistons in said cylinders are reciprocated by piston operative means supported by said housing, the combination with said cylinder and valve elements of a stationary pintle extending from the central portion of the valve element into said cylinder element provided with bearing means mounting the cylinder element on said pintle in operatively rigid and laterally unyielding relation and providing a fixed working clearance between cylinder element and valve face, said bearing means comprising an anti-friction bearing arranged within the cylinder element in close lateral proximity to said valve face operatively supporting the inner end of said cylinder element and an anti-friction bearing arranged within said cylinder element at a distance from said valve face and first mentioned anti-friction bearing operatively supporting the outer end of said cylinder element.

8. In a rotary fluid pump or motor of the class wherein a stationary valve element and a housing element form a housing and the valve element is provided with a circular laterally facing valve face and with inlet and outlet fluid ducts terminating in ports arranged in the valve face, the valve face is operatively associated with laterally extending substantially open ended cylinders of an annular rotatable cylinder element exposed to pressure in one of said ports exerting a lateral separative force tending to separate the cylinder and valve elements from each other, the combination with said cylinder and valve elements of a stationary pintle extending from the central portion of the valve element into said cylinder element provided with bearing means, mounting the cylinder element on said pintle in operatively rigid and laterally unyielding relation, said bearing means comprising a bearing within said cylinder element in close lateral proximity to said valve face operatively supporting the inner end of said cylinder element and an anti-friction thrust bearing within said cylinder element operatively supporting the outer end of said cylinder element and arranged to resist said separative force and to limit the working clearance between cylinder element and valve face.

ALFONS H. NEULAND.